Patented June 23, 1936

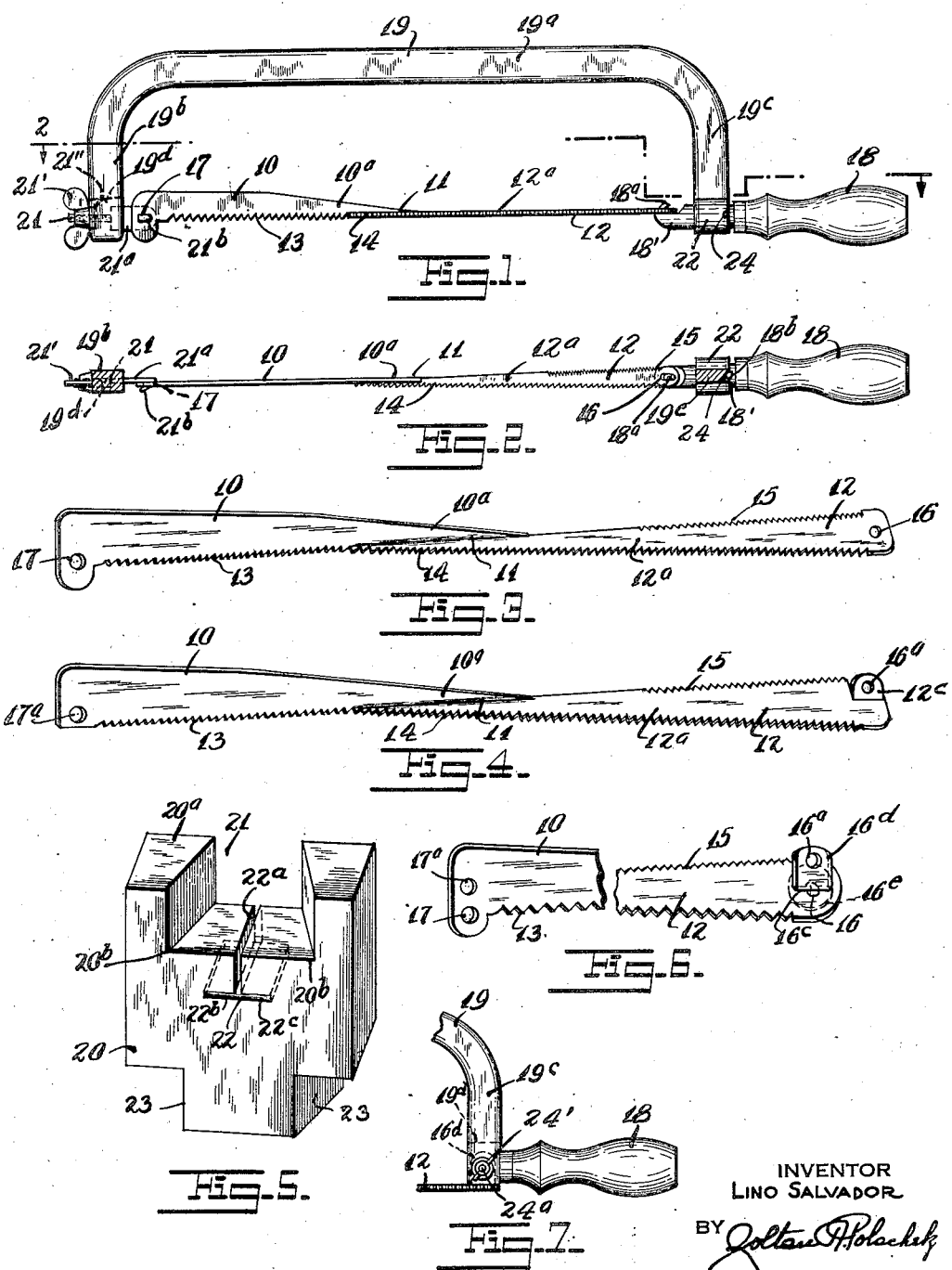

2,045,105

UNITED STATES PATENT OFFICE 2,045,105

HACKSAW BLADE

Lino Salvador, New York, N. Y.

Application December 5, 1935, Serial No. 53,008

2 Claims. (Cl. 143—134)

This invention relates to new and useful improvements in hacksaw blades for L and T shaped cuts.

The invention has for an object the construction of a hacksaw blade from a strip of material having a vertical fore portion with an end portion thereof connected by a bent portion to an end portion of an aft portion in a plane at an angle to the said vertical fore portion, and hacksaw teeth upon the bottom edge of the vertical fore portion and upon the side edges of the aft portion.

It is old to construct a saw blade from a strip of material having a vertical portion with saw teeth along a section of the bottom edge thereof continuing along the side edge of a bottom flange or portion bent from said vertical portion.

The advantage of the instant invention over the prior constructions previously explained, resides in the fact that with the new arrangement it is possible to saw in a vertical plane to any desired depth and continue sawing in a horizontal plane to any desired distance. With the prior constructions it was only possible to saw vertically to any desired depth and to continue sawing horizontally to the maximum width of the flange portion previously mentioned, and no further.

A further object of the invention is the provision of means for facilitating the attachment of the hacksaw to a hacksaw frame arranged in a manner to prevent undue stresses upon the blade which is liable to break it.

Another object of the invention is the construction of a device as described which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a hacksaw with a blade constructed according to this invention.

Fig. 2 is a horizontal sectional view taken on the line 2—2 of Fig. 1.

Fig. 3 is a perspective view of the blade, per se.

Fig. 4 is a perspective view of a blade constructed according to another embodiment of this invention.

Fig. 5 is a perspective view of a block of wood with several cuts formed with the hacksaw disclosed.

Fig. 6 is a fragmentary perspective view of another hacksaw blade constructed according to a further modification of the invention.

Fig. 7 is a fragmentary side elevational view of a hacksaw with a blade according to a modified form of the invention.

The hacksaw blade, according to this invention, is formed with a strip of material having a vertical fore portion 10 with an end 10$^a$ thereof connected by a bent portion 11 to an end portion 12$^a$ of an aft portion 12 in the plane at an angle to the vertical fore portion. The bottom edge of the vertical fore portion 10 is formed with saw teeth 13 continuing at the end portion 10$^a$ with saw teeth 14 on one edge of the aft portion 12. Saw teeth 15 are formed upon the other edge of the aft portion 12. The end portion 10$^a$ of the fore portion tapers down, as clearly shown in Figs. 1 and 3 so as to continue into the plane of the aft portion.

A feature of the bent portion 11 is that the material of the hacksaw at this area is composed of sections at right angles to each other acting as a reinforcement, and stiffening the hacksaw blade.

A further and more important feature of the invention is that the aft portion 12 is not obstructed by the fore portion 10, so that it is possible to saw horizontally to any desired distance.

A means is provided for facilitating the attachment of the hacksaw upon a hacksaw frame in such a manner as to reduce or eliminate stresses liable to break the hacksaw. More particularly, an aperture 16 is formed in the free end of the aft portion 10 and is located so that its axis is in the same plane as the plane of the vertical fore portion 10. An aperture 17 is formed in the free end of the fore portion 10 and is arranged with its axis in the same plane as the plane of the aft portion 12. With this arrangement it is possible to engage holding pintles through the apertures 16 and 17 and reciprocate the hacksaw without any deflecting stresses.

In Figs. 1 and 2 a hacksaw frame is shown consisting of a handle 18 connected with a frame 19. This frame comprises a central portion 19$^a$ connected with ends 19$^b$ and 19$^c$. The lower portion of the end 19$^b$ is formed with a slot 19$^d$ into which the end of the fore portion 10 engages. A screw 21 passes through the slot 19$^d$ in the portion 19$^b$ and has an enlarged end portion 21$^a$ with a hook 21$^b$ engaging the opening 17. A wing nut 21' threadedly engages on the screw 21 and has a shank portion 21" engaging in a recess on the edge of the portion 19b. The lower end of the portion 19c is formed with an enlarged loop 22 into which extension bar 18' of handle 18, slidably and rotatably engages. The extension bar 18' is provided with a hook 18a, adapted to engage through the aperture 16. The extension bar is also provided with an aligning pin 18b for selectively engaging corresponding horizontal or vertical slots 24 in the face of loop 22 when the blade is tight in the holder.

It will readily be seen that the hacksaw may be reciprocated forwards and backwards and at all times there will be no bending moments exerted on the blade.

In Fig. 4 another embodiment of the invention has been disclosed in which the blade is adapted to be mounted upon a conventional hacksaw frame instead of a special frame as described in the previous paragraph. With the arrangement shown in Fig. 4, there is an aperture 16a formed in a vertical lug portion 12c stamped from the aft portion 12 and this aperture 16a is in line with an aperture 17a formed in the free end of the fore portion 10. This blade may be attached by wing screws or by any other arrangement upon the ends of a hacksaw blade of conventional design in which it is required that apertures be located in the ends of a standard blade (a blade in which all portions are in the vertical plane).

In Fig. 5 a block of wood 20 is illustrated with several cutout portions formed with a saw constructed according to this invention. The top of the block 20 is formed with an opening 21 produced by vertical and converging cuts extended down from the top face 20a of the block to the points 20b. These portions of the cuts are formed with the fore portion of the hacksaw blade. When the points 20b have been reached, the hacksaw blade is drawn forwards so that the aft portion 12 goes into operation. The sawing may be towards the right or the left since there are teeth on both sides of the aft portion.

The block 20 is also shown with an inverted T shaped cut 22 formed with the hacksaw. This T shape cut comprises a vertical cut 22a formed with the fore portion of the blade and connecting with horizontal cuts 22b and 22c formed respectively with one and the other sides of the aft portion. The block 20 also has its lower corners formed with cutouts 23 consisting of vertical cuts connecting with horizontal cuts to cut out the corners thereof.

In Fig. 6 another modified form of the invention has been disclosed in which there is a hacksaw blade shown adapted to be mounted upon a hacksaw holder of the type illustrated in Fig. 1 or also upon the conventional hacksaw holder. More particularly, the fore portion 10 of the hacksaw blade is formed with the apertures 17 and 17a. The free end of the aft portion 12 is formed with the aperture 16 which connects with a longitudinal slot 16c. A lug 16d engages through the longitudinal slots 16c and connects with a head portion 16e on the bottom side of the blade. The lug 16d is formed with an aperture 16a. Thus, the apertures 16a and 17a may be utilized for attaching the saw on a conventional hacksaw frame, or the lug 16d may be removed by slipping it through the slot 16c, and then the apertures 16 and 17 may be utilized for attaching the blade to a hacksaw frame as illustrated in Figs. 1 and 2.

In Fig. 7 a wing clamping screw 24' is arranged at the side of the side portion 19c of the frame 19 and engages a threaded bolt 24a. The bolt passes through the side portions 19c and aperture 16a of lug 16d.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A hacksaw blade for L and T shaped cuts, comprising a strip of material having a vertical fore portion with an end portion thereof connected by a bent portion to an end portion of an aft portion in a plane at an angle to the vertical fore portion, the bottom edge of the vertical fore portion having saw teeth continuing at the end portion with saw teeth on one edge of the aft portion, and saw teeth on the other edge of the aft portion, and means for facilitating attachment of the blade on a hacksaw frame comprising an aperture in the free end of the fore portion and a complementary aperture similiary arranged in comparison with said aperture and formed in a lug which is parallel to said fore portion and connected with the free end of the aft portion for use in a hacksaw frame of conventional type.

2. A hacksaw blade for L and T shaped cuts, comprising a strip of material having a vertical fore portion with an end portion thereof connected by a bent portion to an end portion of an aft portion in a plane at an angle to the vertical fore portion, the bottom edge of the vertical fore portion having saw teeth continuing at the end portion with saw teeth on one edge of the aft portion, and saw teeth on the other edge of the aft portion, and means for facilitating attachment of the blade on a hacksaw frame, comprising a pair of apertures in the free end of the vertical fore portion, an aperture in the free end of the horizontal aft portion and connecting with a slot, a lug parallel with said fore portion and mounted through the slot and upon said end and formed with an aperture coactible with one of the apertures of the fore portion for the attachment of the blade in position on the hacksaw frame of conventional type.

LINO SALVADOR.